United States Patent
Zalivaka et al.

(10) Patent No.: US 11,394,529 B2
(45) Date of Patent: Jul. 19, 2022

(54) ENCODER AND DECODER USING PHYSICALLY UNCLONABLE FUNCTIONS

(71) Applicant: SK hynix Inc., Gyeonggi-do (KR)

(72) Inventors: Siarhei Zalivaka, Minsk (BY); Alexander Ivaniuk, Minsk (BY)

(73) Assignee: SK hynix Inc., Gyeonggi-do (KR)

( * ) Notice: Subject to any disclaimer, the term of this patent is extended or adjusted under 35 U.S.C. 154(b) by 363 days.

(21) Appl. No.: 16/746,512

(22) Filed: Jan. 17, 2020

(65) Prior Publication Data

US 2021/0226772 A1 Jul. 22, 2021

(51) Int. Cl.
*H04L 29/06* (2006.01)
*H04L 9/06* (2006.01)
*G06F 11/10* (2006.01)
*G06F 7/58* (2006.01)

(52) U.S. Cl.
CPC ............ *H04L 9/0643* (2013.01); *G06F 7/582* (2013.01); *G06F 11/1076* (2013.01)

(58) Field of Classification Search
CPC ..... H04L 9/0643; G06F 7/582; G06F 11/1076
USPC .......................................................... 713/168
See application file for complete search history.

(56) References Cited

U.S. PATENT DOCUMENTS

| | | | |
|---|---|---|---|
| 8,510,608 B2* | 8/2013 | Futa | H04L 9/0866 714/48 |
| 10,469,270 B2 | 11/2019 | Goettfert | |
| 2003/0220806 A1* | 11/2003 | Hoffman | G06Q 30/06 705/348 |
| 2013/0254441 A1* | 9/2013 | Kipnis | H03M 7/3079 710/68 |
| 2015/0248458 A1* | 9/2015 | Sakamoto | G06N 5/02 707/719 |

OTHER PUBLICATIONS

Amazon, "What is a key-value database?", Amazon, 2019 [Online]. Available: https://aws.amazon.com/nosql/key-value/ [Accessed: May 3, 2019].

(Continued)

*Primary Examiner* — Evans Desrosiers
(74) *Attorney, Agent, or Firm* — IP & T Group LLP

(57) ABSTRACT

A device includes an encoder and a decoder using physically unclonable functions. The encoder includes a first generator for generating a first hash value based on first input data; a first exclusive OR (XOR) operator for performing an XOR operation between second input data and a cryptographic value to generate a first operation value; a second XOR operator for performing an XOR operation between the first hash value and the first operation value to generate a second operation value; a second generator for generating a second hash value based on the first operation value; and an encoding component for encoding the first input data, the second operation value and the second hash value to output first to third encoded data. The decoder contains the same generators and XOR operators as the encoder. It additionally includes a decoding component and a comparator for checking a validity of first and second input data.

5 Claims, 9 Drawing Sheets

(56) References Cited

OTHER PUBLICATIONS

Zalivaka, S. S. et al., "Design and implementation of high quality PUF for hardware-oriented cryptography," in Secure System Design and Trustable Computing, C. H. Chang and M. Potkonjak Ed., Springer International Publishing AG, Switzerland, pp. 39-81, Oct. 2015.

Zalivaka, S. S. et al., "Reliable and modeling attack resistant authentication of arbiter PUF in FPGA implementation with trinary quadruple response," IEEE Trans. Inf. Forens. and Secur., vol. 14, No. 4, pp. 1109-1123, Apr. 2019.

Jeong, W. et al., "Improving Flash Storage Performance by Caching Address Mapping Table in Host Memory," in Proc. USENIX Workshop on Hot Topics in Storage and File Systems, HotStorage'17, Santa Clara, CA, USA, Jul. 10-11, 2017.

Dorgelo, J. et al., "Host Memory Buffer (HMB) based SSD System", in Proc. Flash Memory Summit, FMS'15, Santa Clara, CA, USA, Aug. 10-12, 2015.

\* cited by examiner

ENCODER AND DECODER USING PHYSICALLY UNCLONABLE FUNCTIONS

BACKGROUND

1. Field

Embodiments of the present disclosure relate to an encoder and a decoder.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Memory systems using memory devices provide excellent stability, durability, high information access speed, and low power consumption, since they have no moving parts. Examples of memory systems having such advantages include universal serial bus (USB) memory devices, memory cards having various interfaces such as a universal flash storage (UFS), and solid state drives (SSDs). A memory system includes an encoder for encoding data to be written to a memory device and a decoder for decoding data read from the memory device.

SUMMARY

Aspects of the present invention include an encoder and a decoder using physically unclonable functions.

In one aspect, an encoder includes a first generator for generating a first hash value based on first input data; a first exclusive OR (XOR) operator for performing an XOR operation between second input data and a cryptographic value to generate a first operation value; a second XOR operator for performing an XOR operation between the first hash value and the first operation value to generate a second operation value; a second generator for generating a second hash value based on the first operation value; and an encoding component for encoding the first input data, the second operation value and the second hash value to output first to third encoded data.

In another aspect, a decoder includes a decoding component for decoding first to third input data to output first decoded data as a first decoded value, second decoded data and third decoded data; a first generator for generating a first hash value based on the first decoded data; a first exclusive OR (XOR) operator for performing an XOR operation between the second decoded data and the first hash value to generate a first operation value; a second XOR operator for performing an XOR operation between the first operation value and a cryptographic value to generate a second decoded value; a second generator for generating a second hash value based on the first operation value; and a comparator for comparing the third decoded data with the second hash value to generate information indicating whether a pair, containing the first and second decoded values, is valid.

In another aspect, a device including an encoder and a decoder. The encoder includes a first generator for generating a first hash value based on first input data; a first exclusive OR (XOR) operator for performing an XOR operation between second input data and a cryptographic value to generate a first operation value; a second XOR operator for performing an XOR operation between the first hash value and the first operation value to generate a second operation value; a second generator for generating a second hash value based on the first operation value; and an encoding component for encoding the first input data, the second operation value and the second hash value to output first to third encoded data. The decoder includes a decoding component for decoding first to third encoded data to output first decoded data as a first decoded value, second decoded data and third decoded data; a third generator for generating a third hash value based on the first decoded data, the third generator and the third hash value being the same as the first generator and the first hash value, accordingly; a third XOR operator for performing an XOR operation between the second decoded data and the third hash value to generate a third operation value; a fourth XOR operator for performing an XOR operation between the third operation value and the cryptographic value to generate a second decoded value; a fourth generator for generating a fourth hash value based on the third operation value, the fourth generator and the fourth hash value being the same as the second generator and the second hash value, accordingly; and a comparator for comparing the third decoded data with the fourth hash value to generate information indicating whether a pair, containing the first and second decoded values, is valid.

Additional aspects of the present invention will become apparent from the following description.

DETAILED DESCRIPTION

Figure 1:
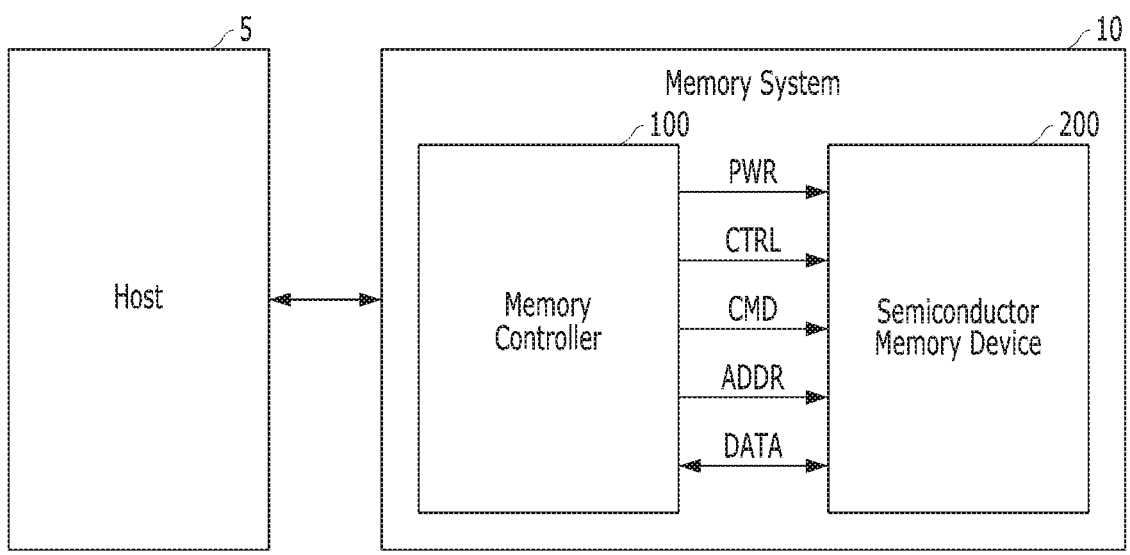
FIG. 1 is a block diagram illustrating a data processing system in accordance with an embodiment of the present invention.

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a computer program product embodied on a computer-readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims. The invention encompasses numerous alternatives, modifications and equivalents within the scope of the claims. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

FIG. 1 is a block diagram illustrating a data processing system 2 in accordance with an embodiment of the present invention.

Referring FIG. 1, the data processing system 2 may include a host device 5 and a memory system 10. The memory system 10 may receive a request from the host device 5 and operate in response to the received request. For example, the memory system 10 may store data to be accessed by the host device 5.

The host device 5 may be implemented with any one of various kinds of electronic devices. In various embodiments, the host device 5 may include an electronic device such as a desktop computer, a workstation, a three-dimensional (3D) television, a smart television, a digital audio recorder, a digital audio player, a digital picture recorder, a digital picture player, and/or a digital video recorder and a digital video player. In various embodiments, the host device 5 may include a portable electronic device such as a mobile phone, a smart phone, an e-book, an MP3 player, a portable multimedia player (PMP), and/or a portable game player.

The memory system 10 may be implemented with any one of various kinds of storage devices such as a solid state drive (SSD) and a memory card. In various embodiments, the memory system 10 may be provided as one of various components in an electronic device such as a computer, an ultra-mobile personal computer (PC) (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

The memory system 10 may include a memory controller 100 and a semiconductor memory device 200. The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output lines. The semiconductor memory device 200 may receive power PWR through a power line and a control signal CTRL through a control line. The control signal CTRL may include a command latch enable signal, an address latch enable signal, a chip enable signal, a write enable signal, a read enable signal, as well as other operational signals depending on design and configuration of the memory system 10.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host device (e.g., host device 5 of FIG. 1) coupled to the memory system 10 may remarkably improve.

The memory controller 100 and the semiconductor memory device 200 may be integrated in a single semiconductor device such as a memory card. For example, the memory controller 100 and the semiconductor memory device 200 may be so integrated to configure a personal computer (PC) card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

Figure 2:
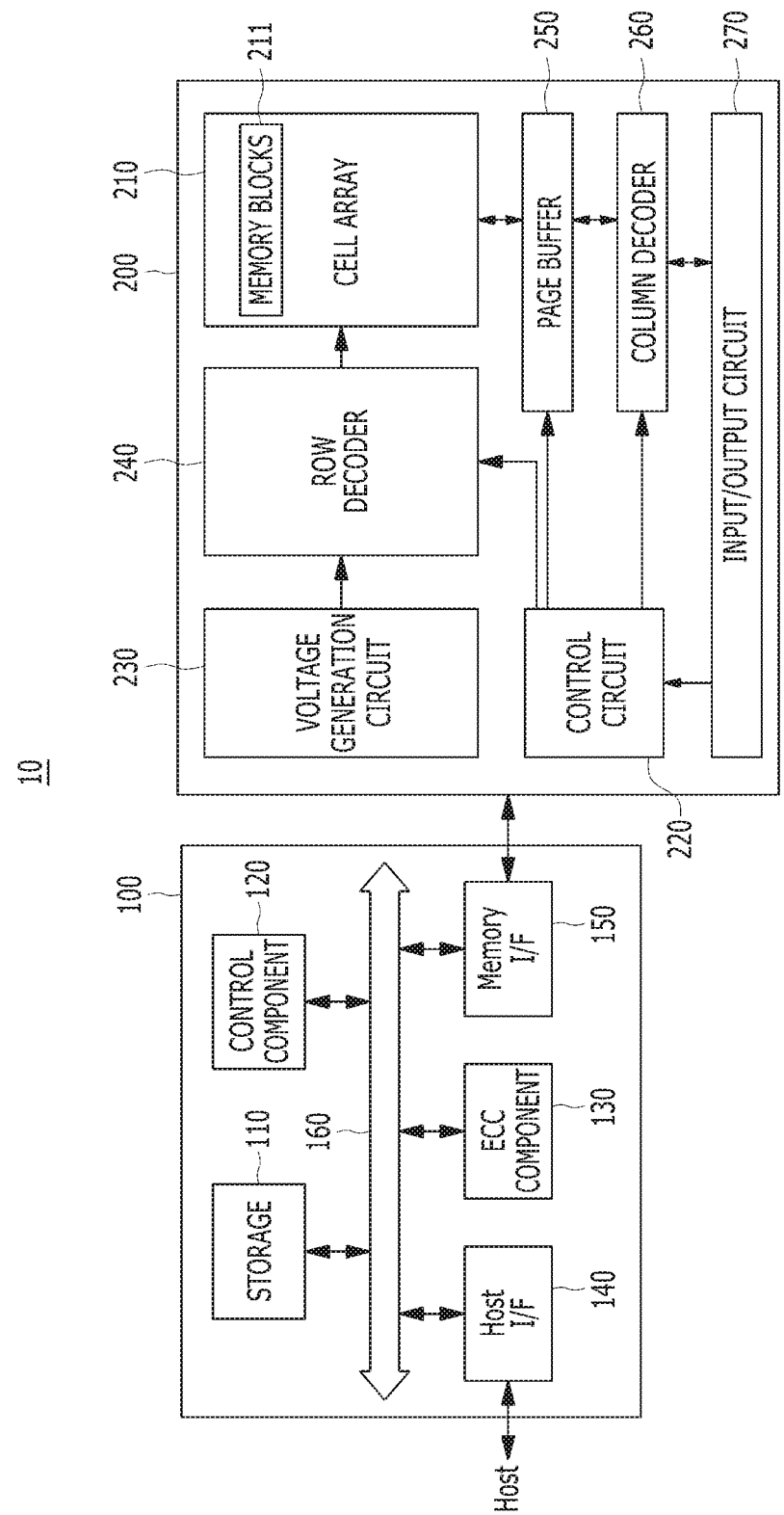
FIG. 2 is a block diagram illustrating a memory system in accordance with an embodiment of the present invention.

FIG. 2 is a block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device (e.g., host device 5 of FIG. 1), and in particular, store data to be accessed by the host device.

The memory device 200 may store data to be accessed by the host device.

The memory device 200 may be implemented with a volatile memory device such as a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor such as a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200, in response to a write request or a read request from the host device. The control component 120 may drive firmware, which is referred to as a flash translation layer (FTL), to control general operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

In various embodiments, the ECC component 130 may perform an error correction operation based on a coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). However, error correction is not limited to these techniques. As such, the ECC component 130 may include any and all circuits, systems or devices for suitable error correction operation.

The host interface 140 may communicate with the host device through one or more of various interface protocols such as a universal serial bus (USB), a multi-media card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component 120. When the memory device 200 is a flash memory such as a NAND flash memory, the memory interface 150 may generate control signals for the memory and process data under the control of the control component 120.

The memory device 200 may include a memory cell array 210, a control circuit 220, a voltage generation circuit 230, a row decoder 240, a page buffer 250, which may be in the form of an array of page buffers, a column decoder 260, and an input and output (input/output) circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address generated by the control circuit 220, and transmit operation voltages supplied from the voltage generation circuit 230 to the selected memory blocks.

Figure 3:
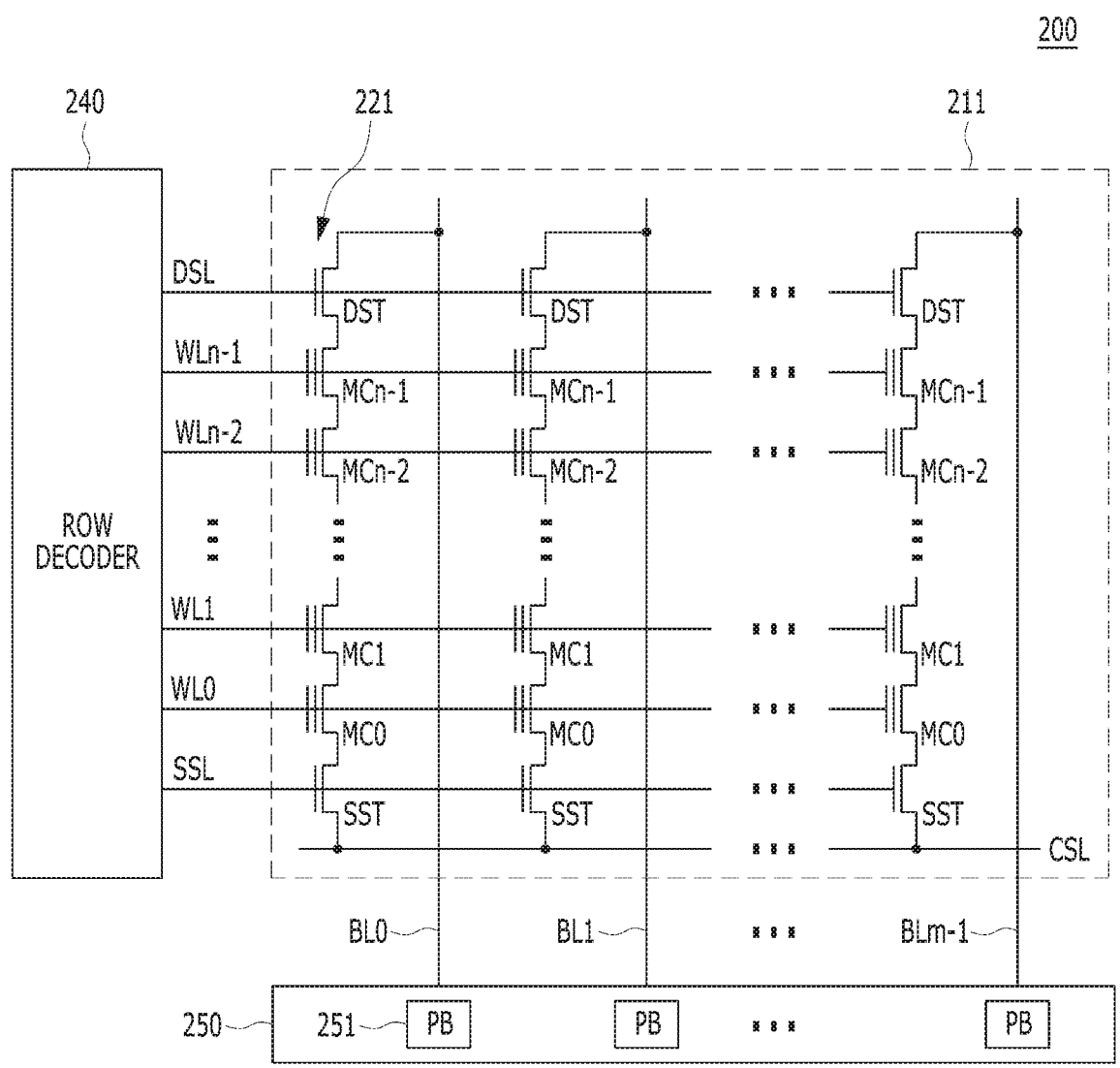
FIG. 3 is a circuit diagram illustrating a memory block of a memory device in accordance with an embodiment of the present invention.

The page buffer 250 may be coupled with the memory cell array 210 through bit lines BL (shown in FIG. 3). The page buffer 250 may precharge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer 250 or transmit and receive data to and from the input/output circuit 270.

The input/output circuit 270 may transmit to the control circuit 220 a command and an address, received from an external device (e.g., the memory controller 100 of FIG. 1), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with an embodiment of the present invention. For example, the memory block of FIG. 3 may be any of the memory blocks 211 of the memory cell array 210 shown in FIG. 2.

Referring to FIG. 3, the exemplary memory block 211 may include a plurality of word lines WL0 to WLn-1, a drain select line DSL and a source select line SSL coupled to the row decoder 240. These lines may be arranged in parallel, with the plurality of word lines between the DSL and SSL.

The exemplary memory block 211 may further include a plurality of cell strings 221 respectively coupled to bit lines BL0 to BLm-1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn-1 may be serially coupled between the selection transistors DST and SST. Each of the memory cells may be formed as a multiple level cell. For example, each of the memory cells may be formed as a single level cell (SLC) storing 1 bit of data. Each of the memory cells may be formed as a multi-level cell (MLC) storing 2 bits of data. Each of the memory cells may be formed as a triple-level cell (TLC) storing 3 bits of data. Each of the memory cells may be formed as a quadruple-level cell (QLC) storing 4 bits of data.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer array 250 may include a plurality of page buffers 251 that are coupled to the bit lines BL0 to BLm-1. The page buffers 251 may operate in response to page buffer control signals. For example, the page buffers 251 my temporarily store data received through the bit lines BL0 to BLm-1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

In a data processing system (e.g., a computing system) as described above, data may be stored in a memory therein using various representations (e.g., binary numbers, strings and/or compressed formats). A certain format such as an attribute-value pair may be used to represent data. The attribute-value pair (or a name-value pair, key-value pair or field-value pair) is a fundamental data representation in computing systems and applications Some of the applications and the like in which data is represented as attribute-value pairs includes e-mail, headers; query strings, URLs; optional elements in network protocols; bibliographic information, as in Bib Tex and Dublin Core metadata; some kinds of database systems; Internet messages; and JSON objects. Due to limitations of available memory space, some attribute-value pairs may be stored externally on an untrusted party. For example, a general structure 400 for transmitting attribute-value pairs to the untrusted party is shown in FIG. 4.

Figure 4:
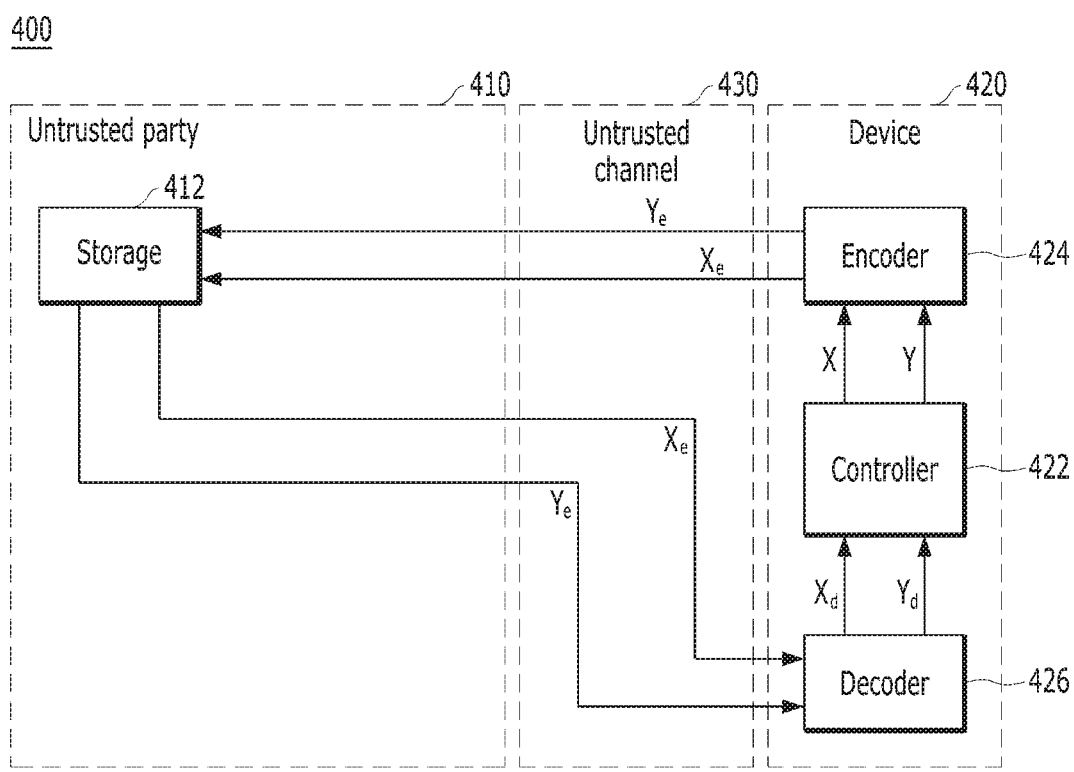
FIG. 4 is a diagram illustrating a general structure for transmitting data from a device to an untrusted party.

In FIG. 4, a device 420 includes a controller 422. The device 420 may correspond to the memory system (or a storage device) 10 of FIG. 2. The controller 422 extracts data from a memory (not shown) stored therein and generates an attribute-value pair (X, Y) regarding the data, which includes an attribute value (X) and a value (Y) linked to the attribute value (X). The attribute-value pair is encoded by an encoder 424 using an error correction code (ECC) in order to avoid data loss during transmission. The encoder 424 generates the encoded pair $(X_e, Y_e)$ and sends it via an untrusted channel 430 to the untrusted party 410. The storage 412 stores the pair $(X_e, Y_e)$. When the pair $(X_e, Y_e)$ is requested by the device 420, the pair $(X_e, Y_e)$ is sent back to the device 420. The pair $(X_e, Y_e)$ is decoded by the decoder 426 to generate the original attribute-value pair $(X_d=X, Y_d=Y)$.

Figure 5:
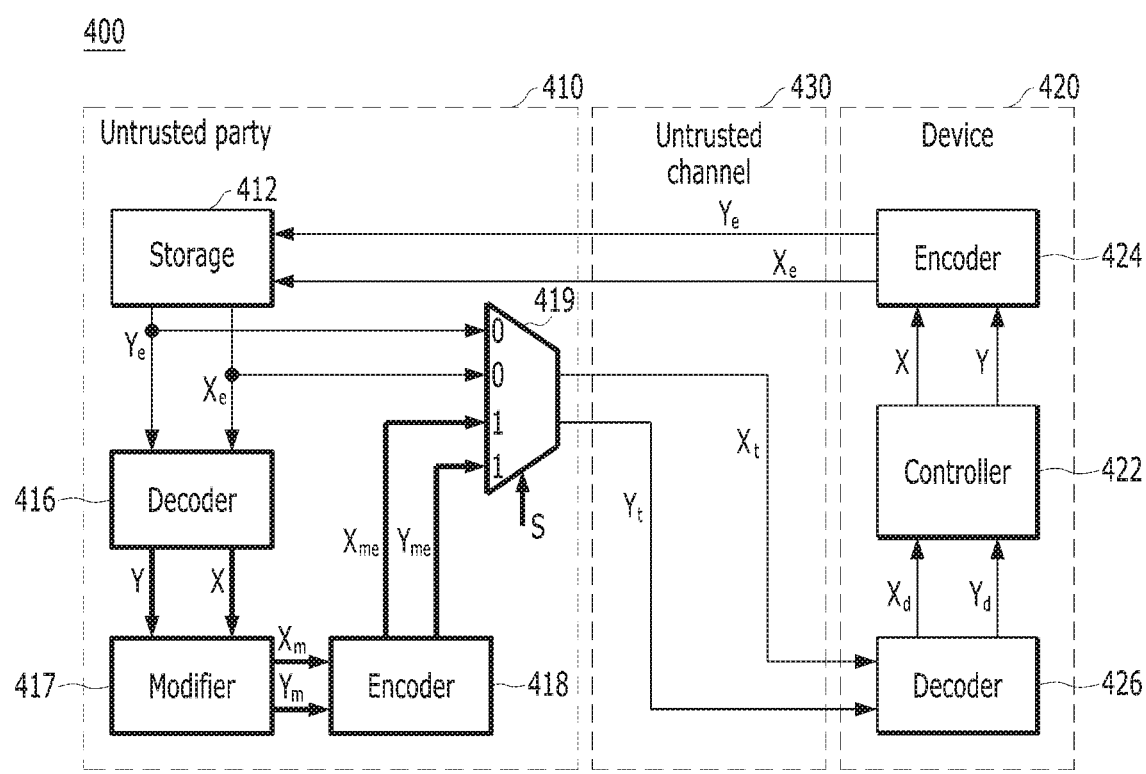
FIG. 5 is a diagram illustrating a structure of the untrusted party, which may be subject to attack, shown in FIG. 4.

When data is stored on the untrusted party 410, an attacker can observe and modify both the untrusted party 410 and the untrusted channel 430. One possible attack scenario is shown in FIG. 5. Since a certain ECC engine is used to encode the data from the device 420, it is possible to clone the decoder 426 and the encoder 424 of the device 420, and implement the cloned decoder 416 and the cloned encoder 418 on the untrusted party 410. The decoder 416 decodes the pair $(X_e, Y_e)$ from the storage 412 to generate the original attribute-value pair (X, Y). The original attribute-value pair (X, Y) can be modified by a modifier 417. The modified attribute-value pair $(X_m, Y_m)$ is encoded by the encoder 418. The encoded attribute-value pair $(X_{me}, Y_{me})$ is sent back to the device 420.

The untrusted party 410 may operate in two modes: an ordinary mode in which a multiplexer 419 operates in response to S='0' and an attack mode in which the multiplexer 419 operates in response to S='1'. In the ordinary mode, the pair $(X_e, Y_e)$ is not modified and is sent back to the device 420 through the untrusted channel 430. In the attack mode, the pair $(X_e, Y_e)$ is decoded, the decoded pair (X, Y) is modified, the modified pair $(X_m, Y_m)$ is encoded and the encoded pair $(X_{me}, Y_{me})$ is sent back to the device 420 through the untrusted channel 430. The device 420 receives the pair $(X_t, Y_t)$, which is transmitted from the untrusted party 410. The decoder 426 decodes the pair $(X_t, Y_t)$ to generate the pair $(X_d, Y_d)$. In the attack mode, the decoded pair $(X_d, Y_d)$ is different from the original pair (X, Y). In other words, $(X_d, Y_d) \neq (X, Y)$. The data transmitting scheme as described with reference to FIGS. 4 and 5 may cause the following concerns.

First, the attacker may gain access to the data sent via an untrusted channel as the attacker can decode it using the ECC algorithm. Second, the attacker can modify X and/or Y values in order to modify critical data on the device so that critical data is corrupted and performance of the device is degraded. Although encryption can prevent these concerns, that usually requires deployment of significant memory and hardware resources by the controller. Accordingly, it is desirable to provide a scheme capable of protecting data (e.g., an attribute-value pair (X, Y)) against unauthorized modification and proving that the data is generated by a particular device.

Figure 6:
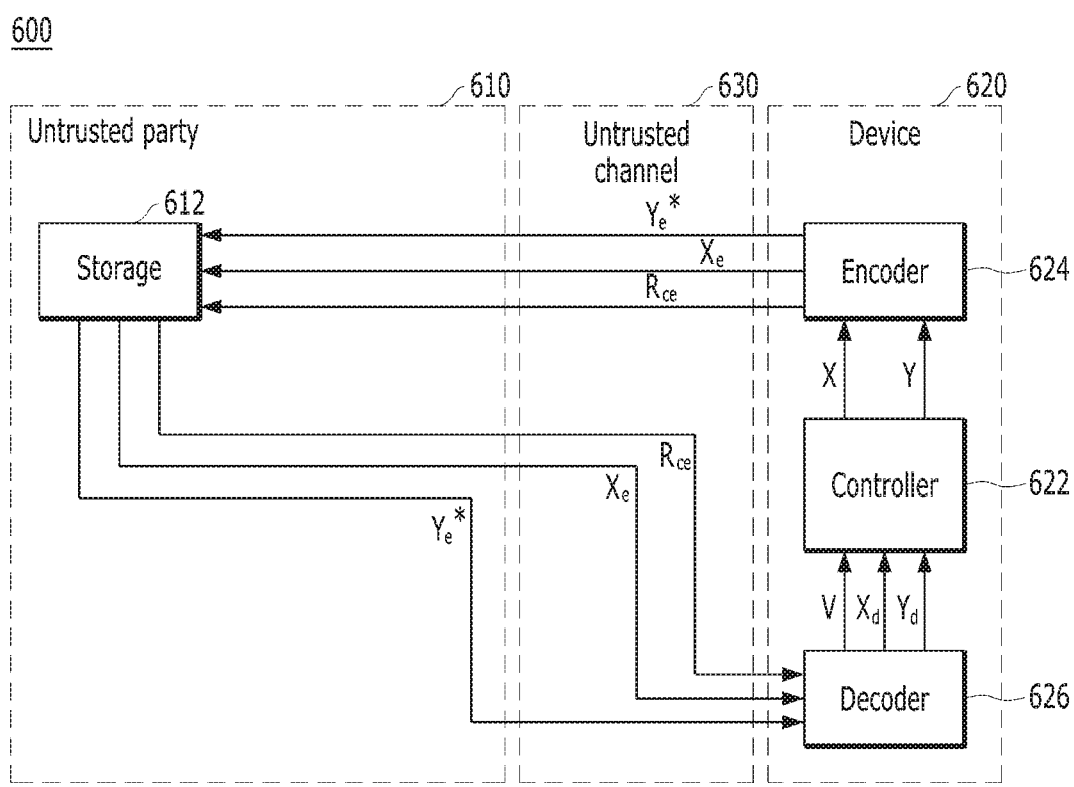
FIG. 6 is a diagram illustrating a system including an encoder and a decoder in accordance with an embodiment of the present invention.

FIG. 6 is a diagram illustrating a system 600 including an encoder and a decoder in accordance with an embodiment of the present invention.

Referring to FIG. 6, the system 600 may include a device 620 coupled to an untrusted party 610 through an untrusted channel 630. The device 620 may include a controller 622, an encoder 624 and a decoder 626. The controller 622 may extract data from a memory (not shown) and generate an attribute-value pair (X, Y) regarding the data. The attribute-value pair may include an attribute value (X) and a value (Y) linked to the attribute value. The encoder 624 may encode the attribute-value pair using an error correction code (ECC) (e.g., a low density parity check (LDPC) code) to generate an encoded data set ($X_e$, $Y_e^*$, $R_{ce}$). The encoder 624 may transmit the data set ($X_e$, $Y_e^*$, $R_{ce}$) via the untrusted channel 630 to the untrusted party 610.

The untrusted party 610 may include a storage 612 that stores the data set ($X_e$, $Y_e^*$, $R_{ce}$) received from the device 620. When the data set ($X_e$, $Y_e^*$, $R_{ce}$) is requested by the device 620, the data set ($X_e$, $Y_e^*$, $R_{ce}$) is transmitted back to the device 620. The decoder 626 may receive and decode the data set ($X_e$, $Y_e^*$, $R_{ce}$) to generate a data set ($X_d$, $Y_d$, V). Each value of the encoded data set ($X_e$, $Y_e^*$, $R_{ce}$) and the decoded data set ($X_d$, $Y_d$, V) is described with reference to FIGS. 7 and 8.

In some embodiments, physically unclonable functions (PUFs) may be used for a particular device. PUF is a hardware security primitive which maps an external input (or challenge) into an output (or response). This mapping (i.e., hashing capability) is unique, unpredictable, and unclonable for the particular chip which has a PUF instance. In addition to this mapping, PUF extracts unique intrinsic features of an integrated circuit of the particular chip. Embodiments are used for protecting data against illegal or unauthorized access and modification.

Figure 7:
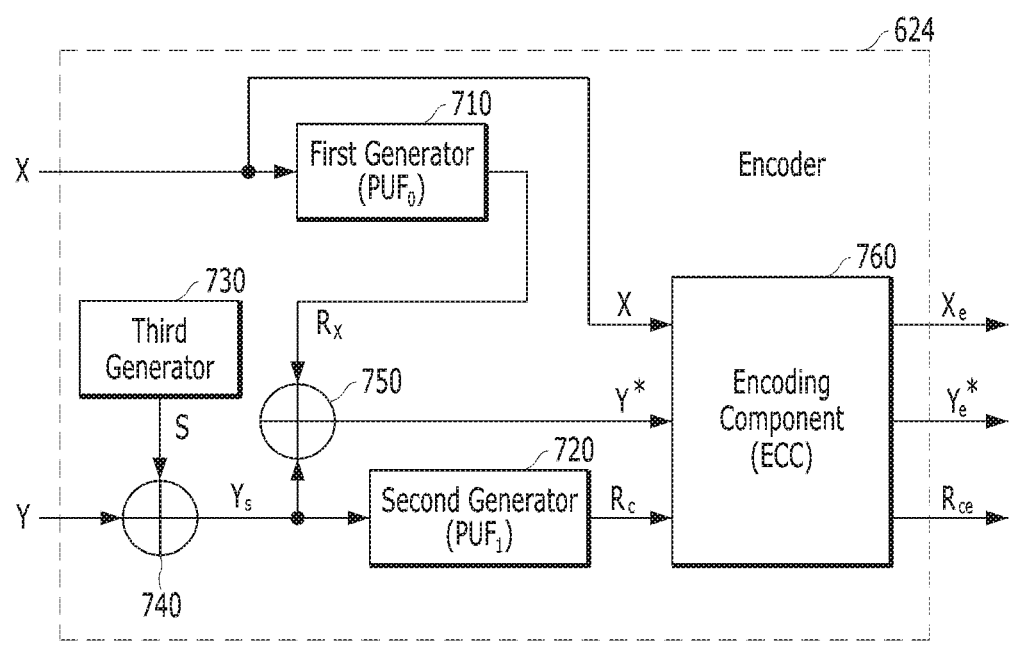
FIG. 7 is a diagram illustrating an encoder in accordance with an embodiment of the present invention.

FIG. 7 is a diagram illustrating an encoder 624 in accordance with an embodiment of the present invention.

Referring to FIG. 7, the encoder 624 may include a first generator 710, a second generator 720, a third generator 730, a first exclusive OR (XOR) operator 740, a second XOR operator 750 and an encoding component 760. The encoder 624 may receive and encode a pair constituted by input data (X) and (Y) to generate the data set ($X_e$, $Y_e^*$, $R_{ce}$), where (X) and (Y) may individually be denoted as first and second input data respectively. In some embodiments, the input data pair (X, Y) includes an attribute-value pair. For example, the first input data (X) includes a logical block address (LBA) and the second input data (Y) includes a physical page number (PPN).

The first generator 710 may receive the first input data (X) and generate a first hash value (Rx) based on the first input data (X). In some embodiments, each of the first and second generators 710 and 720 includes a physically unclonable function (PUF) circuit. The third generator 730 may generate a cryptographic value (S). In some embodiments, the third generator 730 includes a "salt" generator, which is implemented with a PUF or a pseudo random number generator (PRNG), and which generates random data (salt). Salt may be used as an additional input to a one-way function that hashes data. The salt generator may change the value (S) from time to time. For example, the value (S) is changed based on time (e.g., every 10 minutes), the number of exchanged pairs (X, Y), or internal device events. It is used to prevent the attacker from taking advantage of functional dependency between X and Y.

The first XOR operator (or gate) 740 may receive the second input data (Y) and the cryptographic value (S), and perform an XOR operation between the second input data (Y) and the cryptographic value (S) to generate a first operation value ($Y_s$). The second XOR operator 750 may receive the first hash value ($R_x$) and the first operation value ($Y_s$), and perform an XOR operation between the first hash value ($R_x$) and the first operation value ($Y_s$) to generate a second operation value ($Y^*$). The second generator 720 may receive the first operation value ($Y_s$), and generate a second hash value ($R_c$) based on the first operation value ($Y_s$).

The encoding component 760 may receive and encode the first input data (X), the second operation value ($Y^*$) and the second hash value ($R_c$) to generate and output the data set ($X_e$, $Y_e^*$, $R_{ce}$) including first to third encoded data ($X_e$, $Y_e^*$, $R_{ce}$). In some embodiments, the encoding component 760 includes an encoder using an error correction code (ECC) (e.g., a low density parity check (LDPC) code).

As described above, in order to obfuscate the value of Y and the explicit connection between X and Y, an encoding process in accordance with an embodiment is performed as follows.

Step 1: The value (Y) is obfuscated using a cryptographic salt value (S) generated by the third generator 730. In other words, the value ($Y_s$) is obtained through an XOR operation of Y and S (i.e., $Y_s$=Y XOR S).

Step 2: The hash value ($R_x$) is obtained through a first generator (PUF$_0$) on the value (X) (i.e., $R_x$=PUF$_0$(X)).

Step 3: The value ($Y_s$) is encrypted by an XOR operation with the hash value ($R_x$) (i.e., $Y^*$=$Y_s$XOR $R_x$).

Step 4: The hash value ($R_c$) is obtained through a second generator (PUF$_1$) on the value ($Y_s$). The hash value ($R_c$) is used to prove that the pair (X, Y) is generated on the particular device 620.

Step 5: The values (X, $Y^*$, $R_c$) are encoded by the ECC engine so that the values ($X_e$, $Y_e^*$, $R_{ce}$) are obtained.

Step 6: The values ($X_e$, $Y_e^*$, $R_{ce}$) are transmitted via an untrusted channel 630 to the untrusted party 610.

Figure 8:
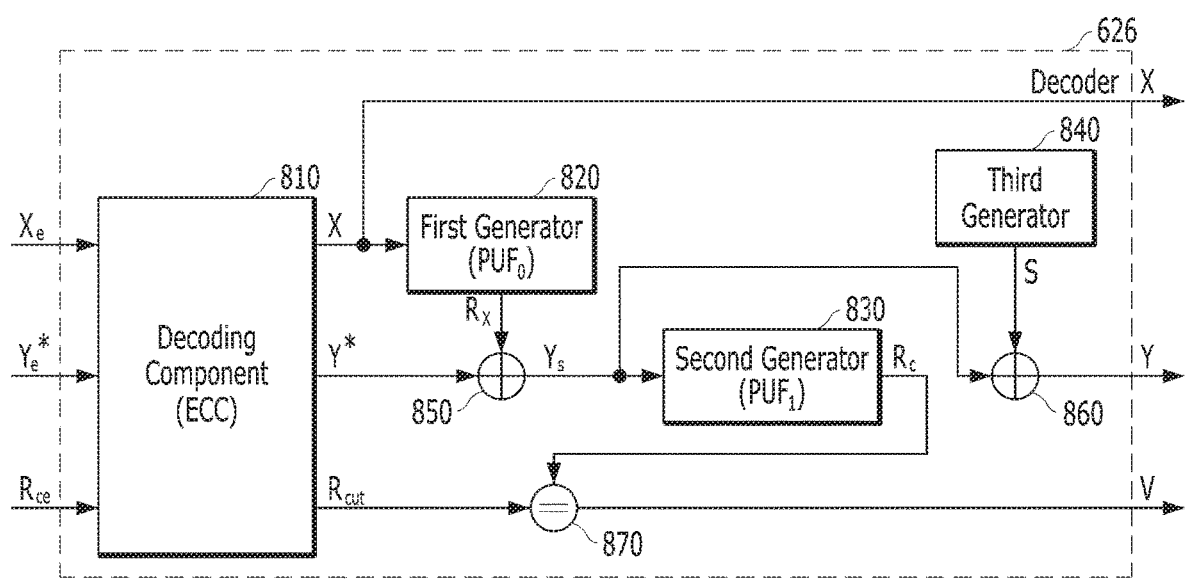
FIG. 8 is a diagram illustrating a decoder in accordance with an embodiment of the present invention.

FIG. 8 is a diagram illustrating a decoder 626 in accordance with an embodiment of the present invention.

Referring to FIG. 8, the decoder 626 may include a decoding component 810, a first generator 820, a second generator 830, a third generator 840, a first exclusive OR (XOR) operator 850, a second XOR operator 860 and a comparator 870. The decoder 626 may receive and decode the data set ($X_e$, $Y_e^*$, $R_{ce}$) including first input data ($X_e$), second input data ($Y_e^*$) and third input data ($R_{ce}$) to generate the decoded data set (X, Y, V).

The decoding component 810 may decode the first input data ($X_e$), the second input data ($Y_e^*$) and the third input data ($R_{ce}$) to generate the decoded data set (X, $Y^*$, $R_{cut}$). The decoding component 810 may output the first decoded data (X) as a first decoded value, second decoded data ($Y^*$) and third decoded data ($R_{cut}$). In some embodiments, the decoding component 810 includes a decoder using an error correction code (ECC) (e.g., a low density parity check (LDPC) code).

The first generator 820 may receive the first decoded data (X) and generate a first hash value ($R_x$) based on the first decoded data (X). In some embodiments, each of the first and second generators 820 and 830 includes a physically unclonable function (PUF) circuit. The third generator 840 may generate a cryptographic value (S). In some embodiments, the third generator 840 includes a salt generator or a pseudo random number generator.

The first XOR operator 850 may receive the second decoded data ($Y^*$) and the first hash value ($R_x$), and perform an XOR operation between the second decoded data ($Y^*$) and the first hash value ($R_x$) to generate a first operation value ($Y_s$). The second XOR operator 860 may receive the first operation value ($Y_s$) and the cryptographic value (S), and perform an XOR operation between the first operation value ($Y_S$) and the cryptographic value (S) to generate a second decoded value (Y).

The second generator 830 may receive the first operation value ($Y_s$), and generate a second hash value ($R_c$) based on the first operation value ($Y_s$). The comparator 870 may receive the third decoded data ($R_{cut}$) and the second hash value ($R_c$). The comparator 870 may compare the third decoded data ($R_{cut}$) with the second hash value ($R_c$) to generate information (V) indicating whether a pair, containing the first and second decoded values (X, Y), is valid. In some embodiments, the decoded value pair (X, Y) includes an attribute-value pair. For example, the first decoded value includes a logical block address (LBA) and the second decoded value includes a physical page number (PPN).

Similar to the encoder 624, the decoder 626 utilizes the same two PUF circuits (820 is the same as 710, 830 is the same as 720) and two multi-input XOR operators (850, 860). To compare the received hash value ($R_{cut}$) with the genuine value ($R_c$), the comparator 870 is used. A decoding process in accordance with an embodiment is performed as follows.

Step 1: The received data set ($X_e$, $Y_e^*$, $R_{ce}$) is decoded to generate values (X, $Y^*$, $R_c$) using the same ECC engine decoding as was previously used for encoding.

Step 2: The hash value ($R_x$) is obtained through a first generator ($PUF_0$) on the value (X) (i.e., $R_x = PUF_0(X)$).

Step 3: The value ($Y_s$) is decrypted by an XOR operation with the hash value ($R_x$) (i.e., $Y_s = Y^*$ XOR $R_x$).

Step 4: The value ($Y_s$) is de-obfuscated into the value (Y) by an XOR operation with the salt value (S).

Step 5: The hash value ($R_c$) is obtained through a second generator ($PUF_1$) on the value ($Y_s$) (i.e., $R_c = PUF_1(Y_s)$).

Step 6: The received hash value under test ($R_{cut}$) is compared with the hash value ($R_c$). Based on the comparison result, information (V) indicating whether a pair, containing the first and second decoded values (X, Y), is valid. When the received hash value ($R_{cut}$) is identical to the hash value ($R_c$) (i.e., $R_c = R_{cut}$), information (or a flag) having a corresponding value is generated (V='1'), which indicates that the received pair (X, Y) has been generated by the device 620. When the received hash value ($R_{cut}$) is different from the hash value ($R_c$) (i.e., $R_c \neq R_{cut}$), information (or a flag) having a corresponding value is generated (V='0'), which indicates that the received pair (X, Y) has not been generated by the device 620.

As described above, in accordance with embodiments, the codeword pair transmitted via the untrusted channel 630 is transformed from ($X_e$, $Y_e$) to ($X_e$, $Y_e^*$, $R_{ce}$). For this change, each of the encoder 624 and the decoder 626 shares two physically unclonable function (PUF) circuits as the first and second generators.

The first PUF (710, 820) generates a hash value ($R_x$) for the attribute value (X) in order to use it as a key for masking the linked value (Y). The encryption process is simplified and hardware overhead is reduced. In other words, the hash value ($R_x$) is XORed with the linked value (Y). The result of encryption ($Y^*$) is further hashed by the second PUF (720, 830). The response of the second PUF (720, 830) is used to check whether the pair (X, Y) is generated on a particular device. The PUFs should be stable (i.e., reliability value≈1.0) and strong (i.e., the number of challenge-response pairs should be exponentially large). For example, arbiter PUF design with enhanced reliability is a candidate for the PUFs in various embodiments. Using PUF for data integrity is beneficial for the following reasons.

The attribute value (X) can be accessible by the untrusted party 610 as it is encoded only by the ECC engine. This does not give an advantage to the attacker as only the knowledge of the pair (X, Y) enables the attacker to observe the data stored on the device 620. Also, the attacker is not able to reproduce hash values generated by PUFs as the attacker does not have access to the internals of the device 620. Moreover, the attacker is not able to modify the data, because it is impossible to create a copy of PUFs. Even if the attacker modifies the data, this fact will be detected by a decoding scheme based on the unique value of ($Y_e^*$, $R_{ce}$). In other words, the generated response values can be used to check whether the pair (X, Y) is generated by the particular device 620.

Further, embodiments are more hardware-efficient than the existing encryption engines (e.g. AES) in terms of utilized chip area and power consumption. Furthermore, encoding the pair (X, Y) using PUFs allows detecting errors even if they were not injected by an attacker, so such scheme can be also utilized instead of error detection engines. Also, data integrity is provided based on PUF usage for both errors introduced by an attacker and errors caused by the noise in the untrusted channel and untrusted party.

Embodiments may be efficiently utilized in the host-aware performance booster (HPB) feature widely used in mobile flash devices, which is considered the same as the host memory buffer (HMB) used in SSD drives. A block diagram of such an HPB is shown in FIG. 9.

Figure 9:
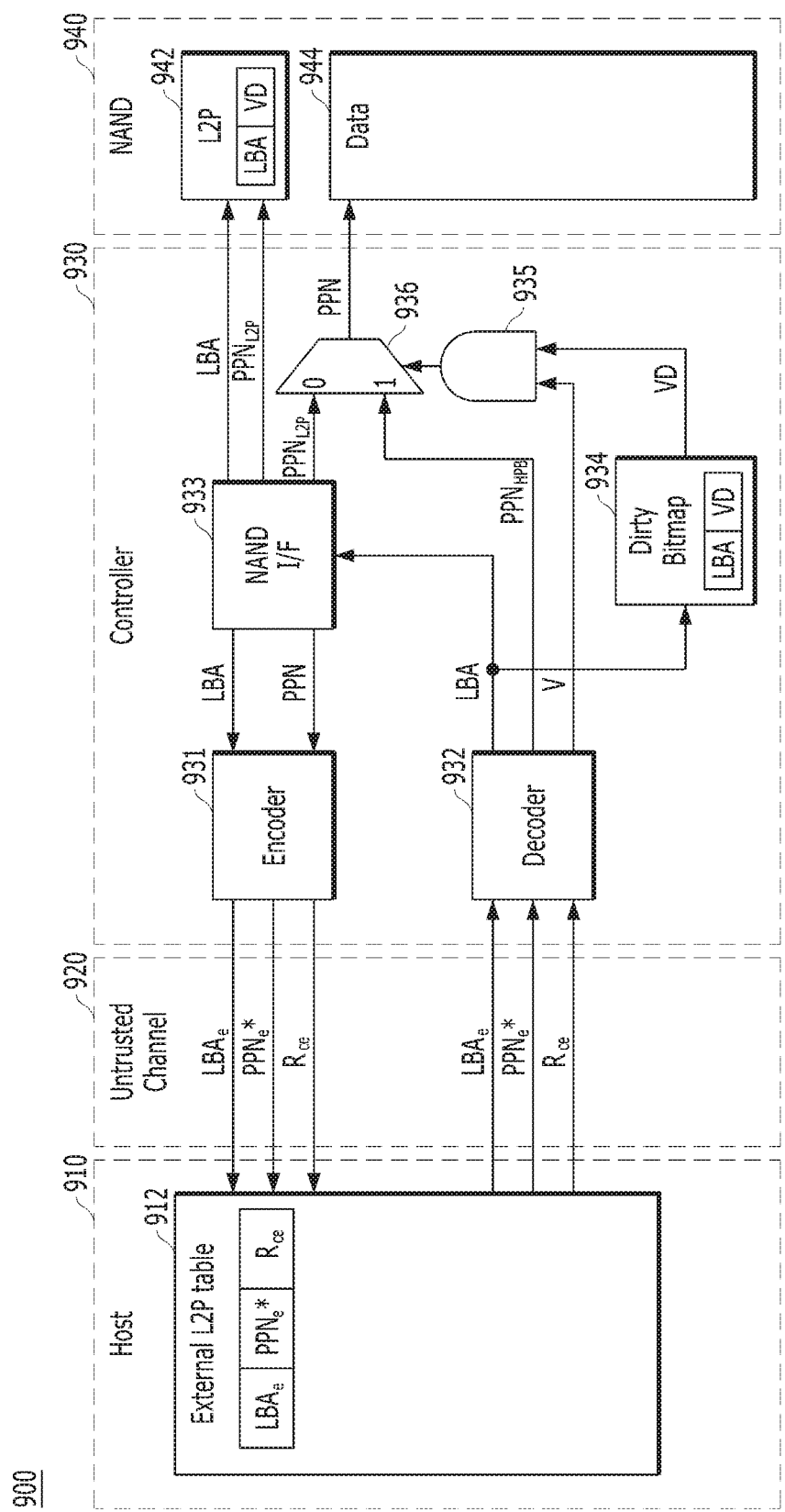
FIG. 9 is a diagram illustrating a system including an encoder and a decoder in accordance with an embodiment of the present invention.

More particularly, FIG. 9 is a diagram illustrating a system 900 including an encoder and a decoder in accordance with an embodiment of the present invention.

Referring to FIG. 9, the system 900 may include a host 910 and a memory system (or a storage device), which communicates via an untrusted channel 920. The memory system may correspond to the device 620 of FIG. 6, which includes a controller 930 and a memory device 940. The memory device 940 may be implemented with a NAND flash memory. The memory device 940 may include a first region 942 and a second region 944. The first region 942 may store a logical-to-physical (L2P) table. The second region 944 may store data. Although not shown in FIG. 9, the memory device 940 may include components of the memory device 200 shown in FIG. 2.

The controller 930 may include an encoder 931, a decoder 932, a NAND interface (I/F) 933, a dirty bitmap 934, an AND gate 935 and a multiplexer 936. The encoder 931 may be implemented with components of the encoder 624 shown in FIG. 7, and the decoder 932 may be implemented with components of the decoder 626 shown in FIG. 8. Although not shown in FIG. 9, the controller 930 may include components of the controller 100 shown in FIG. 2.

The host 910 stores HPB entries in the format ($LBA_e$, $PPN_e^*$, $R_{ce}$). $LBA_e$ is a logical block address (LBA) encoded by the ECC engine, i.e., it can be used by the host 910 as a plaintext. $PPN_e^*$ is a physical page number (PPN) encrypted by the encoder 931. In this case, $LBA_e$ corresponds to $X_e$ and $PPN_e^*$ to $Y_e^*$. $R_{ce}$ is a salted hash value of the PPN.

The system 900 operates as described below.

A pair (LBA, PPN) is generated by the controller 930 and stored in the NAND flash memory 940 as the L2P table 942. In order to use a memory of the host 910 as an external cache, the NAND interface 933 sends the pair (LBA, PPN) to the encoder 931. The encoder 931 encodes the pair (LBA, PPN) into a triplet ($LBA_e$, $PPN_e^*$, $R_{ce}$) according to the encoding algorithm shown in FIG. 7.

If the host 910 decides to use this HPB entry ($LBA_e$, $PPN_e^*$, $R_{ce}$), the host 910 sends the HPB entry ($LBA_e$, $PPN_e^*$, $R_{ce}$) back to the controller 930 together with a command.

The decoder 932 decodes the HPB entry ($LBA_e$, $PPN_e^*$, $R_{ce}$) into LBA, $PPN_{HPB}$ according to the decoding scheme shown in FIG. 8. Also, the decoder 932 generates a value V, which indicates the validity of the received HPB entry (e.g., V='1' when the received HPB entry is valid and V='0' otherwise).

LBA is also checked in the dirty bitmap 934 in order to ensure that the pair (LBA, PPN) was not invalidated. The dirty bitmap 934 returns a validity value VD (e.g., VD='1' when the pair (LBA, PPN) is not invalidated and VD='0' otherwise).

If V and VD are both equal to '1', the NAND interface 933 uses the received LBA and fetches data by the address of $PPN_{HPB}$. Otherwise, it has to search for an LBA and fetch the corresponding PPN from the L2P table 942 in the NAND flash memory 940.

The proposed encoding and decoding scheme ensures that a pair (LBA, PPN) is created by a unique NAND flash memory device as it utilizes PUFs which are irreproducible by an attacker even if the attacker knows the exact design of the encryption algorithm.

As described above, embodiments provide an encoding and decoding scheme for an attribute-value pair which is transmitted via an untrusted channel. The scheme utilizes strong and stable PUFs to prove that the attribute-value pair received from the untrusted party was generated by an authentic device. Furthermore, the scheme may be used as an error detection method to detect errors caused by noise. The scheme appends an initial codeword with an additional hash value which proves the authenticity of the sent pair. The scheme protects transmitted data from modifications by an attacker even when the data is transmitted via an untrusted channel. The scheme detects errors caused by both noise in the channel and an attacker. Less hardware overhead is required for implementation of the inventive scheme compared to conventional encryption engines (e.g. AES). Accordingly, in accordance with embodiments, an encoder and a decoder using PUFs is capable of protecting data (e.g., an attribute-value pair (X, Y)) against unauthorized access or modification on an untrusted channel and/or by an untrusted party. Also, embodiments may protect against errors caused by noise on the untrusted channel and/or by the untrusted party.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives that fall within the scope of the claims.

What is claimed is:

1. A computing device comprising:
an encoder; and
a decoder,
wherein the encoder comprises:
a first generator configured for generating a first hash value based on first input data;
a first exclusive OR (XOR) operator configured for performing an XOR operation between second input data and a cryptographic value to generate a first operation value;
a second XOR operator configured for performing an XOR operation between the first hash value and the first operation value to generate a second operation value;
a second generator configured for generating a second hash value based on the first operation value; and
an encoding component configured for encoding the first input data, the second operation value and the second hash value to output first to third encoded data, and
wherein the decoder comprises:
a decoding component configured for decoding first to third encoded data to output first decoded data as a first decoded value, second decoded data and third decoded data;
a third generator configured for generating a third hash value based on the first decoded data, the third generator and the third hash value being the same as the first generator and the first hash value, accordingly;
a third XOR operator configured for performing an XOR operation between the second decoded data and the third hash value to generate a third operation value;
a fourth XOR operator configured for performing an XOR operation between the third operation value and the cryptographic value to generate a second decoded value;
a fourth generator configured for generating a fourth hash value based on the third operation value, the fourth generator and the fourth hash value being the same as the second generator and the second hash value, accordingly; and
a comparator configured for comparing the third decoded data with the fourth hash value to generate information indicating whether a pair, containing the first and second decoded values, is valid.

2. The device of claim 1, further comprising:
a fifth generator configured for generating the cryptographic value.

3. The device of claim 2, wherein the fifth generator includes a pseudo random number generator.

4. The device of claim 1, wherein each of the first to fourth generators includes a physically unclonable function (PUF) circuit.

5. The device of claim 1, wherein the first input data includes a logical block address and the second input data includes a physical page number.

* * * * *